(12) United States Patent
Inagaki

(10) Patent No.: US 8,533,372 B2
(45) Date of Patent: Sep. 10, 2013

(54) INFORMATION PROCESSING DEVICE AND METHOD OF COLLECTION PROCESS OF DEVICE INFORMATION IN THE INFORMATION PROCESSING DEVICE

(75) Inventor: Junichi Inagaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/609,954

(22) Filed: Sep. 11, 2012

(65) Prior Publication Data

US 2013/0007310 A1 Jan. 3, 2013

Related U.S. Application Data

(63) Continuation of application No. PCT/JP2010/001986, filed on Mar. 19, 2010.

(51) Int. Cl.
*G06F 3/00* (2006.01)
*G06F 15/173* (2006.01)

(52) U.S. Cl.
USPC ............................................ 710/26; 709/223

(58) Field of Classification Search
None
See application file for complete search history.

(56) References Cited

U.S. PATENT DOCUMENTS 8,407,377 B1 * 3/2013 Shapiro et al. ................. 710/23
2007/0067432 A1  3/2007 Tarui et al.
2011/0149960 A1 * 6/2011 Fernandez Gutierrez .... 370/390

FOREIGN PATENT DOCUMENTS

| JP | 54-75955 | 6/1979 |
|----|----------|--------|
| JP | 3-1264 | 1/1991 |
| JP | 11-134287 | 5/1999 |
| JP | 2005-18379 | 1/2005 |
| JP | 2007-86963 | 4/2007 |

OTHER PUBLICATIONS

International Search Report of Corresponding PCT Application PCT/JP2010/001986 mailed Jun. 22, 2010.

* cited by examiner

*Primary Examiner* — Hyun Nam
(74) *Attorney, Agent, or Firm* — Staas & Halsey LLP

(57) ABSTRACT

An information processing device collects status information for a large number of input and output devices simultaneously. A bridge circuit having a multicast function connects an information processing unit with a plurality of input and output devices. By setting the multicast to the bridge circuit, the bridge circuit forwards a packet which instructs a copy of the status information to the plurality of input and output devices by multicast, and a DMA circuit in the plurality of input and output devices simultaneously starts DMA transfer of the status information to the processing unit.

20 Claims, 16 Drawing Sheets

FIG. 6

| | Port #0 MULTICAST REGISTER 34-4 | Port #1 MULTICAST REGISTER 35-4 | Port #2 MULTICAST REGISTER 36-4 | Port #3 MULTICAST REGISTER 37-4 |
|---|---|---|---|---|
| MC_Enable | | | 1 | |
| MC_Num_Group | | | 0 | |
| MC_Base_Address | | | 0xA0000000 | |
| MC_Index_Position | | | 12 | |
| MC_Overlay_BAR | 0 | 0x80001000 | 0x80002000 | 0x80003000 |
| MC_Overlay_Size | 0 | 12 | 12 | 12 |

|  | DEVICE#0 | DEVICE#1 | DEVICE#2 |
|---|---|---|---|
| COPY START REGISTER 80 | 0x 80001000 | 0x 80002000 | 0x 80003000 |
| COPY DESTINATION ADDRESS REGISTER 82 | 0x 80001004 | 0x 80002004 | 0x 80003004 |
| SEQUENCE NUMBER REGISTER 84 | 0x 80001008 | 0x 80002008 | 0x 80003008 |

|  | DEVICE#0 | DEVICE#1 | DEVICE#2 |
|---|---|---|---|
| LOAD START ADDRESS REGISTER 102 | 0x 80001010 | 0x 80002010 | 0x 80003010 |
| LOAD START REGISTER 104 | 0x 80001014 | 0x 80002014 | 0x 80003014 |

FIG. 19

|  | Port #0 MULTICAST REGISTER | Port #1 MULTICAST REGISTER | Port #2 MULTICAST REGISTER | Port #3 MULTICAST REGISTER |
|---|---|---|---|---|
| MC_Enable |  |  | 1 |  |
| MC_Num_Group |  |  | 0 |  |
| MC_Base_Address |  |  | 0xA0000000 |  |
| MC_Index_Position |  |  | 12 |  |
| MC_Overlay_BAR | 0 | 0x80001000 | 0x80002000 | 0x80003000 |
| MC_Overlay_Size | 0 | 12 | 12 | 12 |

34-4, 35-4, 36-4, 37-4

INFORMATION PROCESSING DEVICE AND METHOD OF COLLECTION PROCESS OF DEVICE INFORMATION IN THE INFORMATION PROCESSING DEVICE

CROSS-REFERENCE TO RELATED APPLICATION

This application is a continuation application of International Application PCT/JP2010/001986 filed on Mar. 19, 2010 and designated the U.S., the entire contents of which are incorporated herein by reference.

FIELD

The embodiments discussed herein are related to an information processing device and a method of collection process of device information in the information processing device.

BACKGROUND

The information processing device includes an arithmetic processing device (CPU: Central Processing Unit, hereinafter referred as the CPU), a memory, a plurality of input and output devices (I/O devices). As the I/O devices, an interface device for an external storage device, etc. and a network device for a network are used.

Device drivers are installed to the CPU so that the CPU drives the I/O devices. There is a case that the device driver installed in the CPU collects status of each of the I/O devices and behavioral history of the I/O devices, etc. The device driver collects status of each of the I/O devices and behavioral history of the I/O devices, etc., and executes diagnosis and abnormal detection of each of the I/O devices.

The status and the behavioral history of the I/O devices are stored in registers of the Input and Output device. Therefore, when the plurality of I/O devices is mounted to the information processing device, the device driver separately executes read process of the registers of the I/O devices for each of the I/O devices.

Patent Document

[Patent Document 1] Japanese Laid-open Patent Publication No. Hei 11-134287
[Patent Document 2] Japanese Laid-open Patent Publication No. Sho 54-075955

According to a request for improvement of performance of the information processing device in recently, the number of the I/O devices, which are mounted on the information processing device, is increased. Because of reading the registers of the I/O devices and collecting information of the plurality of the I/O devices for each of the I/O devices, the number of read increases as increase of the number of the I/O devices and the processing time becomes longer.

Further, because of reading the status of the plurality of the I/O devices sequentially, the status of the plurality of the I/O devices for different times are collected. Therefore, it is difficult to collect status of the I/O devices, which operate a high speed, on simultaneous time.

SUMMARY

One feature of the information processing device includes an arithmetic processing unit and storage device that is used the arithmetic processing unit, a plurality of input and output devices each of which has a memory that stores status information and a DMA (Direct Memory Access) circuit and a bridge circuit that connects the arithmetic processing device to the plurality of input and output devices and multicasts a packet from the arithmetic processing unit to the plurality of input and output devices according to setting of a multicast from the arithmetic processing device, and the arithmetic processing device send a packet that instructs a copy start to the bridge circuit, the bridge circuit multicasts the packet that instructs the copy start to the plurality of input and output devices and the DMA circuit DMA transfers the status information in the memory through the bridge circuit to the storage device according to the packet that instructs the copy start.

Further, one feature of a method of collection process of the device information in the information processing device, the information processing device having an arithmetic processing unit and storage device that is used the arithmetic processing unit, a plurality of input and output devices each of which has a memory that stores status information and a DMA (Direct Memory Access) circuit and a bridge circuit that connects the arithmetic processing device to the plurality of input and output devices and multicasts a packet from the arithmetic processing unit to the plurality of input and output devices according to setting of a multicast from the arithmetic processing device, and the method including sending a packet that instructs a copy start from the arithmetic processing device to the bridge circuit, multicasting the packet that instructs the copy start from the bridge circuit to the plurality of input and output devices, and DMA transferring the status information in the memory through the bridge circuit to the storage device by the DMA circuit according to the packet that instructs the copy start.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is a diagram of the setting example of the multicast register in FIG. 5.

FIG. 19 is a diagram illustrating the setting example of the multicast register in FIG. 17.

DESCRIPTION OF EMBODIMENTS

The embodiments will be explained below in the following order; a method of collection process of device information in information processing device, the information processing device, a multicast function, a input and output device, a lump download process, but the disclosed information processing device is not limited to this embodiments.

(A Method of Collection Process of Devices Information in an Information Processing Device)

Figure 1:
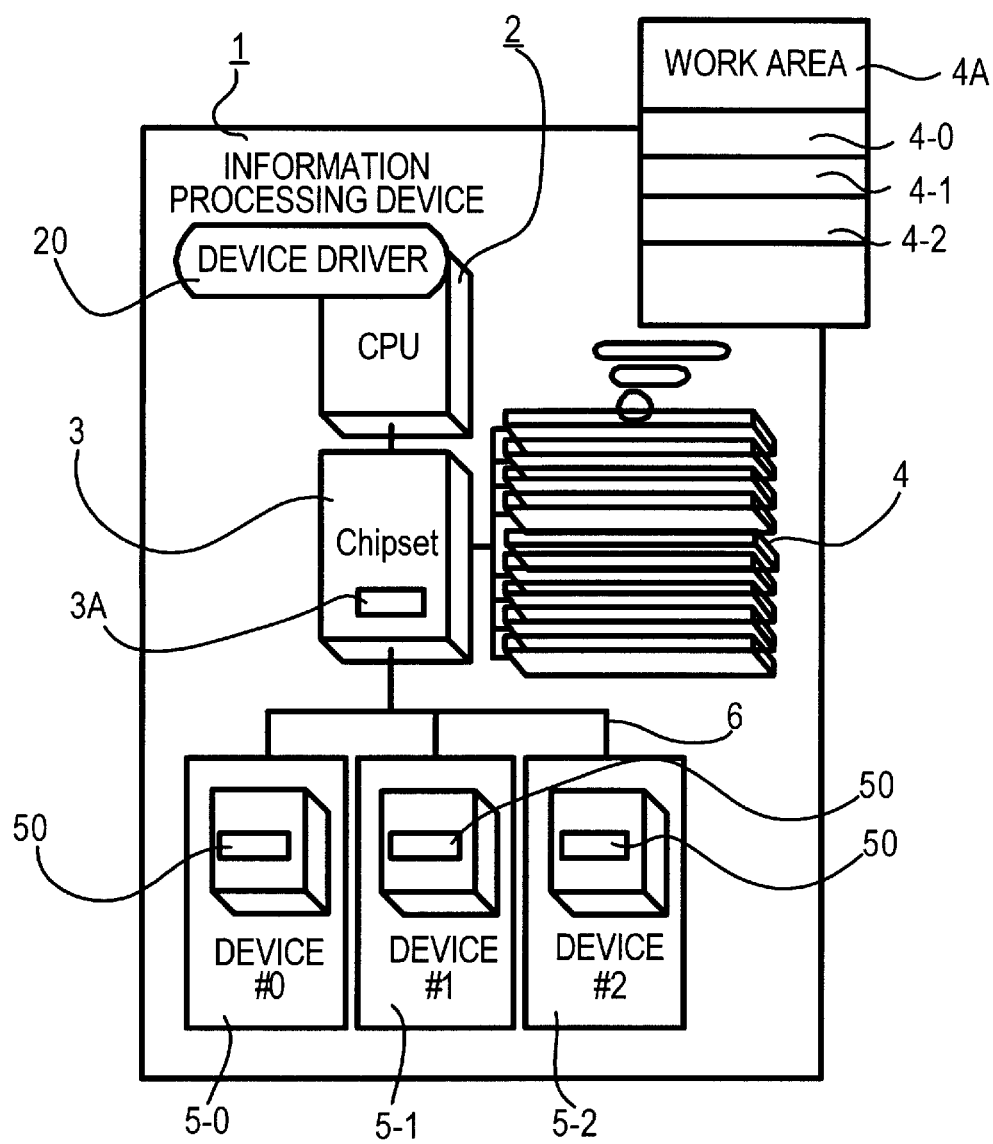
FIG. 1 is a block diagram illustrating an information processing device according to an embodiment.
Figure 2:
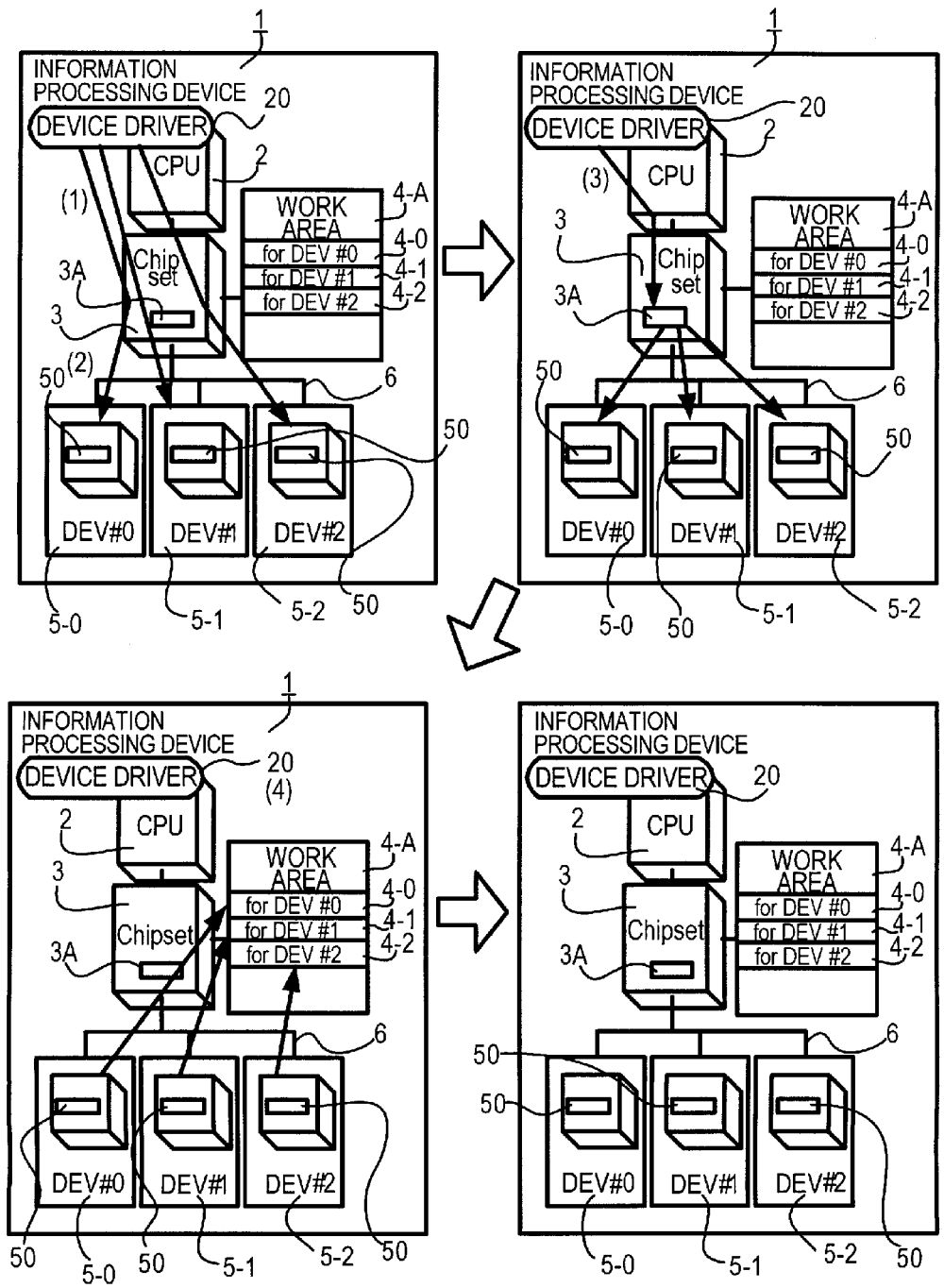
FIG. 2 is a diagram explaining device information collection process by the configuration in FIG. 1.

FIG. 1 is a block diagram illustrating an information processing device according to an embodiment. FIG. 2 is a diagram explaining device information collection process by the configuration in FIG. 1. An information processing device 1 includes an arithmetic processing device (CPU: Central processing Unit) 2, a host memory 4 that is used by the CPU 2, a bridge circuit (hereinafter referred as a chip set) 3 having a multicast function, a plurality of input and output devices 5-0, 5-1 and 5-2 that are connected to the bridge circuit 3.

The information processing device 1 is installed a device driver 20 which drives each of the input and output devices 5-0-5-2. The CPU 2 runs the device driver 20 and drives each of the input and output devices 5-0-5-2. The bridge circuit 3 connects to each of the input and output devices 5-0-5-2 by signal lines 6. The signal lines 6 are constructed by, for example, parallel signal lines by PCI (Peripheral Component Interface) express specification. The bridge circuit 3 has a multicast function 3A. As the multicast function, for example, PCI express specification rev (revised) 2.0 and 2.1 is suitable applied.

The input and output devices 5-0~5-2 are devices, in which the CPU 2 inputs and outputs to and from external devices, and has an interface device and a network devices, for example. The interface device is a SCSI (Small Computer System Interface) card device, a SAS (Serial Attached SCSI) card device, or a FC (Fibre Channel) device, etc. for example. This interface device is connected to an external storage device which is provided outside of the information processing device 1.

And the network device is, for example, NIC (Network Interface Card), and connects the information processing device 1 to network (for example, LAN (Local Area Network)) and a network switch.

A data collection process of the device driver 20 secures a copy area of the register 4-0~4-2 for each of the input and output devices 5-0~5-2 in a work area 4A of a host memory 4. Further, each of the input/output devices 5-0~5-2 has a DMA (Direct Memory Access) circuit 50 for a copy of register. The DMA circuit 50 for the copy of the register has a function to copy register information of the input and output devices 5-0~5-2 to a specified host memory area according to a write (Write) operation to a specified registers as a trigger. The collection method of device information in the device driver 20 will be explained by referring to FIG. 2. In following explanations, signs (1)~(5) illustrated in FIG. 2 (1) correspond to the process described below.

(1) The device driver 20 secures the register copy area 4-0~4-2 for each of the input and output device 5-0~5-2 in the work area 4A of the host memory 4.

(2) The device driver 20 individually sets a start address of the register copy area 4-0~4-2 for each of the input and output devices 5-0~5-2 to each of the input and output devices 5-0~5-2. That is, the device driver 20 writes start address of the register copy area 4-0~4-2 in the work area 4A of the host memory 4 to register which is provided in the DMA circuit 50 and specifies destination.

(3) The device driver 20, in order to simultaneous read the registers information of the input and output devices 5-0~5-2, executes register write (Write) by multicast by using the multicast function 3A of the bridge circuit 3, and indicates the start of the register copy to each of the input and output devices 5-0~5-2. That is, the device driver 20 writes copy start instruction bit (bit) of the registers for copy control of register provided to the DMA circuit 50 for register copy.

(4) The DMA circuit 50 for register copy in the input and output devices 5-0~5-2 DMA transfers (DMA Write) the register information to the specified address of the host memory and copies.

(5) The device driver 20 refers the register information in the work area 4A of the host memory 4 at once.

Thereafter, by repeating the process (3) through (5), it is possible to obtain the register information when the device driver 20 collects data.

Because of instructing the start of DMA transfer by using multicast functional, it is possible to shorten the time to read (Read) registers in each of the input and output devices. Especially it is effective when the number of the input and output devices to execute the read (Read) of the registers is many.

(Information Processing Device)

Figure 3:
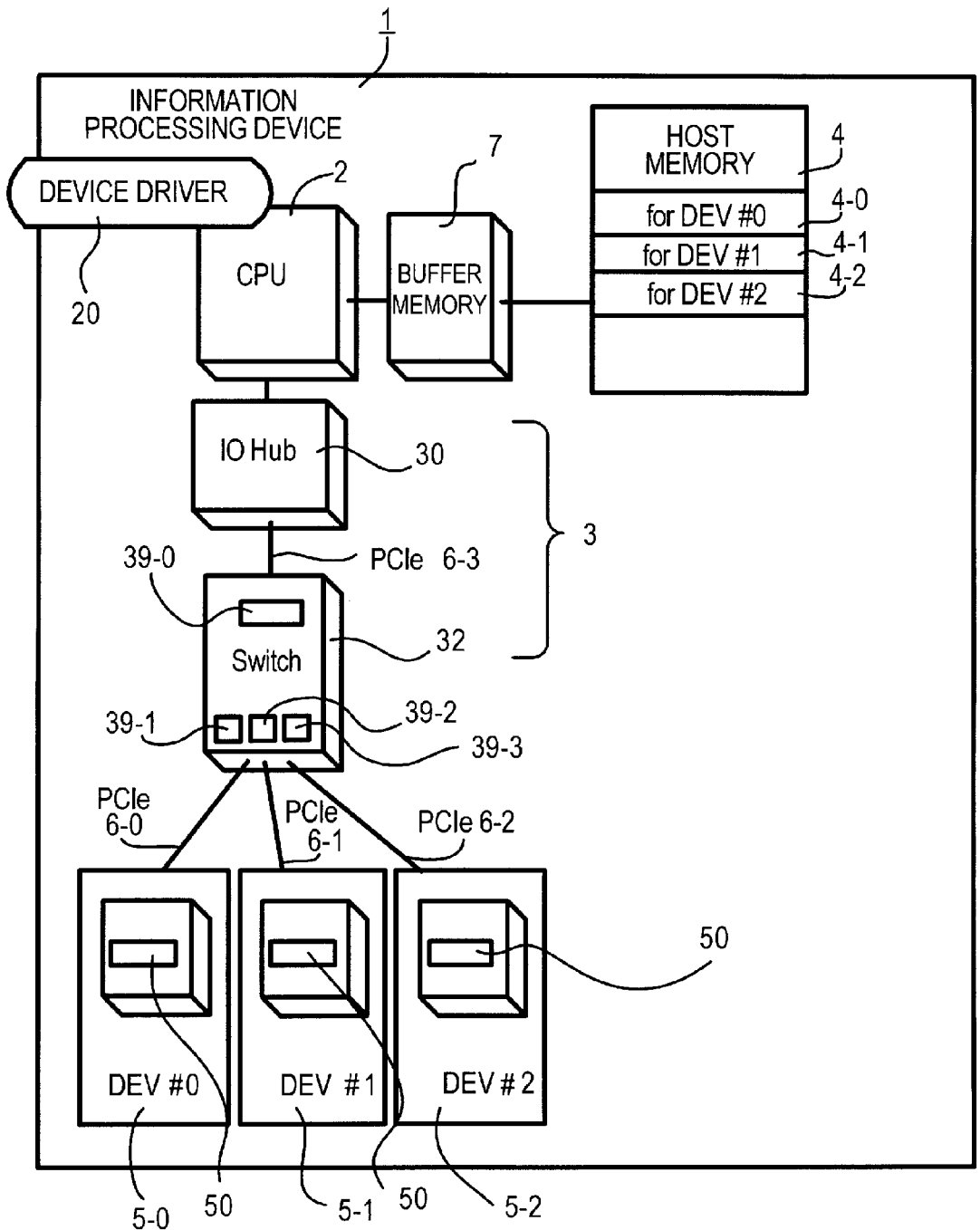
FIG. 3 is a detailed configuration diagram of the information processing device in FIG. 1.

FIG. 3 illustrates a block diagram of the information processing device in one embodiment. In FIG. 3, same elements as illustrated in FIG. 1 are described in the same sign. In FIG. 3, the information processing device 1 includes a CPU 2, a host memory 4 that is used by the CPU 2, a buffer memory 7. The CPU 2 connects to the host memory through the buffer memory 7.

The information processing device 1 further includes a I/O (Input and Output) hub 30 which constructs the bridge circuit 3, a switch circuit 32 having a multicast function and a plurality of input and output devices 5-0, 5-1 and 5-2 that are connected to the switch circuit 32.

The CPU 2 is connected to the I/O hub 30. The I/O hub 30 connects fourth port 39-0 of the switch circuit 32 No. 4 by PCI express (called as PCIe) bus 6-3. The switch circuit 32 further has a first port 39-1~a third port. Each of the first port 39-1~the third port 39-3 connects to each of the input and output devices 5-0~5-2 by the PCIe bus 6-0~6-2. Each of the ports 39-0 to 39-3 of the switch circuit 32 has PCIe multicast function as described later. The switch circuit 32 illustrates a switch of 1 input to 3 outputs, but not limited to the switch, can be applied to a switch of one-to-N (N>1, and N is an integer).

The CPU 2 runs the device driver 20, drives each of the input and output devices 5-0~5-2, and executes the collection of the device information. The input and output device 5-0~5-2 are constructed by the interface device and network devices as mentioned.

The data collection process of the device driver 20 secures the copy area of the register 4-0~4-2 for each of the input and output devices 5-0~5-2 in the work area 4A of the host memory 4. Further, each of the input/output devices 5-0~5-2 has the DMA (Direct Memory Access) circuit 50 for a copy of register. The DMA circuit 50 for the copy of the register has a function to copy register information of the input and output devices 5-0~5-2 to a specified host memory area according to a write (Write) operation to a specified registers as a trigger.

In the embodiment illustrated in FIG. 3, the host memory 4 is connected to the CPU 2 through the buffer memory 7. On the other hand, in the configuration illustrated in FIG. 1, the host memory 4 connects to the CPU 2 through the bridge circuit 3. Both configurations also can be applied, but, in the configuration illustrated in FIG. 3, it is possible to extend the number of memory onboard by the buffer memory 7.

(Multicast Function)

Figure 4:
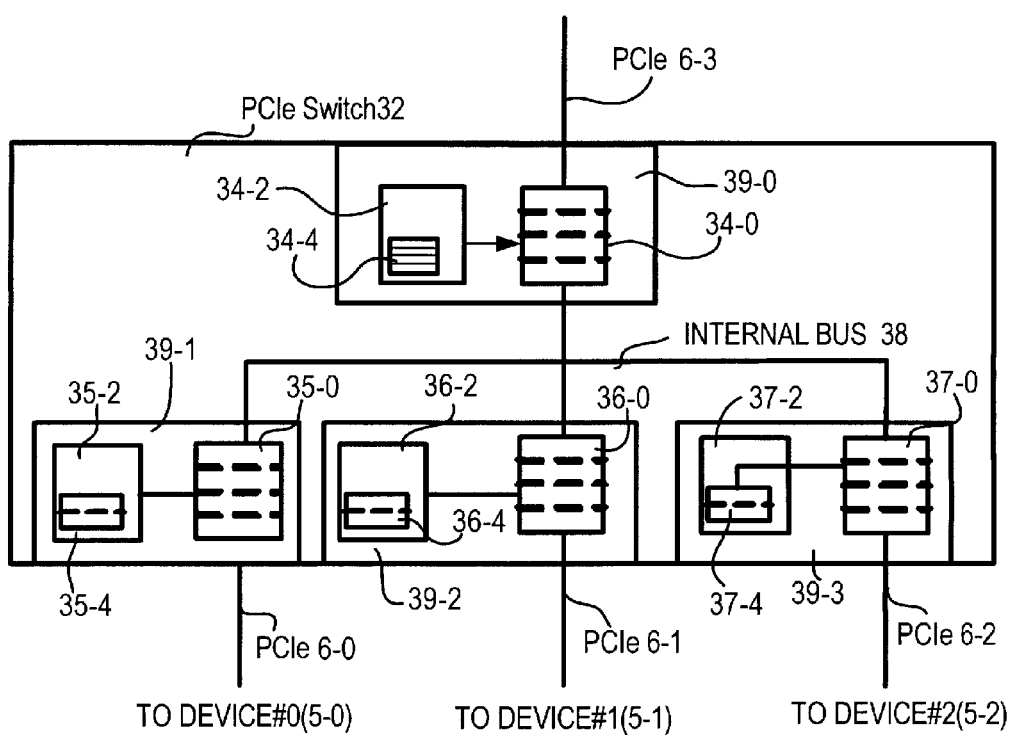
FIG. 4 is a diagram illustrating the switch circuit in FIG. 3.
Figure 5:
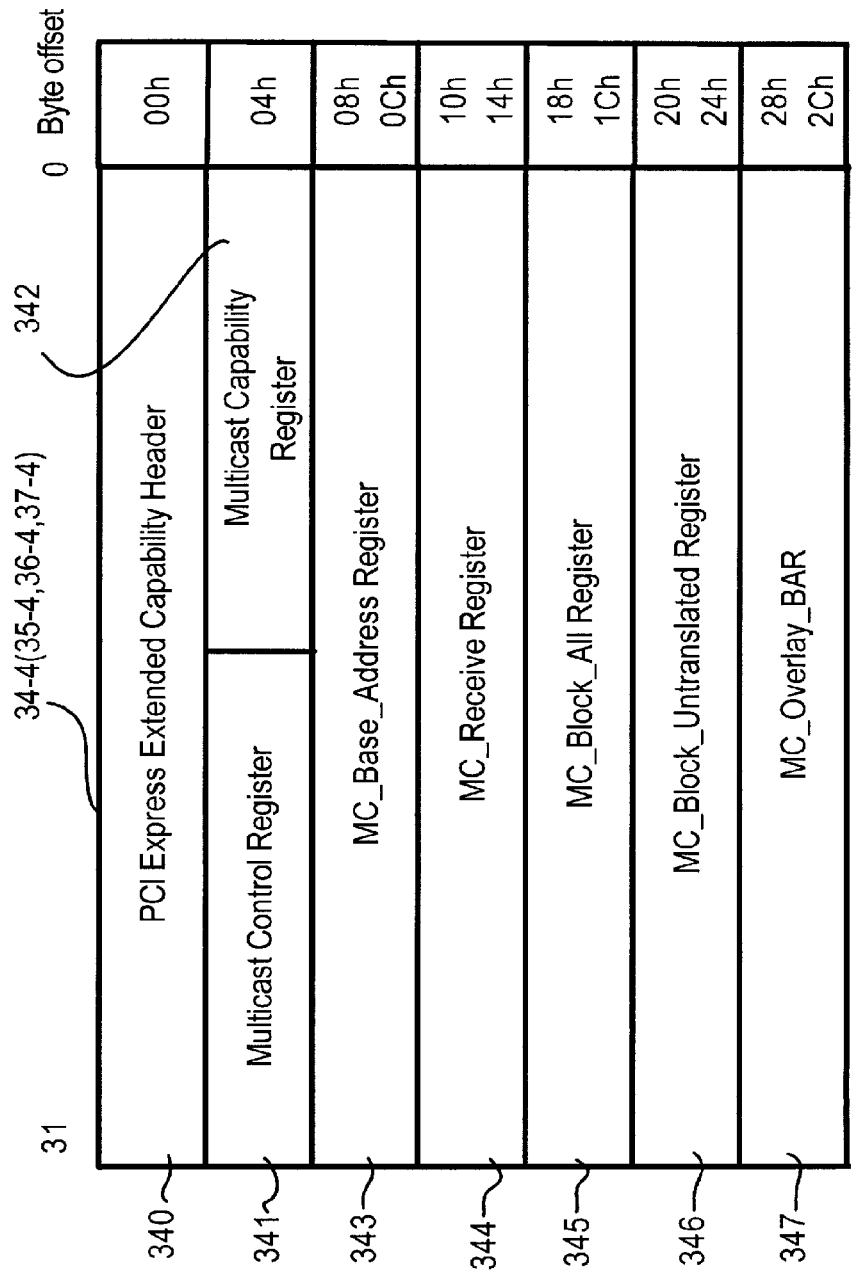
FIG. 5 is a diagram explaining the multicast register in FIG. 3.
Figure 7:
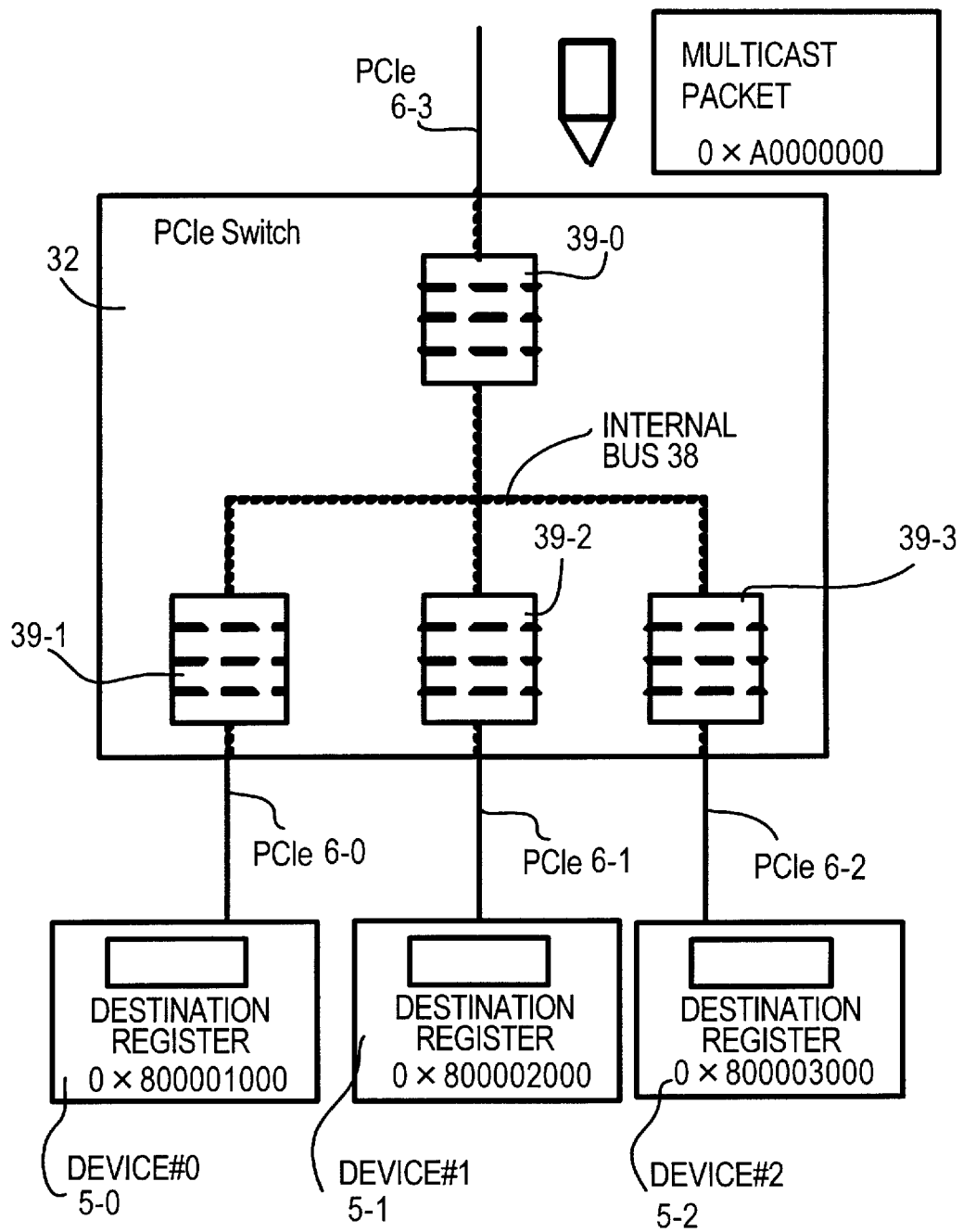
FIG. 7 is a diagram illustrating multicast operation in the setting example of the multicast register in FIG. 6.

Next, the switch circuit 32 with the multicast function will be explained. FIG. 4 illustrates a diagram of a configuration of the switch circuit 32 illustrated in FIG. 3. FIG. 5 illustrates a diagram explaining the multicast register in FIG. 3. FIG. 6 illustrates a diagram of the setting example of the multicast register in FIG. 5. FIG. 7 illustrates a diagram illustrating multicast operation in the setting example of the multicast register in FIG. 6. In this embodiment, the multicast function is explained as the form of the implementation of this multicast function of the PCI express specification.

As illustrated in FIG. 4, each of the ports 39-0~39-3 includes a packet send and receive buffers 34-0, 35-0, 36-0 and 37-0, and packet analysis units 34-2, 35-2, 36-2 and 37-2 having multicast registers 34-4, 35-4, 36-4 and 37-4. Each of the ports 39-0~39-3 are connected by an internal bus 38.

When the send/receive buffer 34-0 receives a packet (a PCIe packet) from the PCIe bus 6-3, the packet analysis unit 34-2 judges whether or not the received packet is a packet which writes to the specified address range.

And the packet analysis unit 34-2 judges that the received packet is a packet which writes to the specified address range, the packet analysis unit 34-2 decides that the received packet is a multicast packet. When the packet analysis unit 34-2 decides that the received packet is a multicast packet, the packet analysis unit 34-2 forwards the received packet to all the other ports 39-1~39-3.

On the other hand, when the packet analysis unit 34-2 decides that the received packet is not a packet which writes to the specified address range, the packet analysis unit 34-2 decides that the received packet is a unicast packet. When the packet analysis unit 34-2 decides that the received packet is a unicast packet, the packet analysis unit 34-2 transfers the received packet to the ports 39-1~39-3 which is designated by the received packet.

In order to judge whether the packet is a multicast or a unicast, the packet analysis units 34-2~37-2 have multicast registers 34-4~37-4. For example, in PCI express specification for rev2. 0 And 2, the multicast register specification is defined as illustrated in FIG. 5.

In FIG. 5, the multicast register 34-4~37-4 has a PCI-Express extended function header (Extended Capability Header) 340, a control register for multicast (Multicast Control Register) 341, a multicast function register (Multicast Capability Register) 342, a multicast base address register (MC_Base_Address Register) 343, a multicast reception register (MC_Receive Register) 344, a multicast block registers (MC_Block_All Register) 345, a multicast block untranslated register (MC_Block_Untranslated Register) 346, a multicast overlay register (MC_Overlay_Bar) 347.

The PCI-Express Extended Capability Header 340 indicates a start of a series of register group for multicast. The Multicast Control Register 341 is set setting bits which control the Multicast, that is, a MC_Enable which makes the multicast function to be effective and a MC_Num_Group which indicates the number of activate MCG (Multicast Group). In addition, the number of MCG=(MC_Num_Group+1).

The Multicast Capability Register 342 is set information of the multicast function which is possible in the device (the switch 32). For example, the number of MCG which can support is set. The value that determines the Multicast Address ranges is set to the MC_Base_Address Register 343. That is, the MC_Base_Address which indicates a start position of the multicast address and the MC_Index_Position which indicates the multicast address area size of one MCG are set to the MC_Base_Address Register 343. The multicast area size by this MC_Index_Position is a $2^{MC\_Index\_Position}$.

The MC_Receive Register 344 is set data which indicate whether or not receive the multicast packet for each of the MCG. The MC_Block_All Register 345 is set data which indicate whether or not transfer the multicast packet for each of the MCG. The MC_Block_Untranslated Register 346 is set data which indicate whether or not forward the multicast packet which is not executed address translation for each of the MCG.

The MC_Overlay_Bar 347 is set address for replacing the address of the multicast packet and the overlay size MC_Overlay_Size which conduct the overlay when the overlay is effective. The overlay is executed to per $2^{MC\_Overlay\_Size}$ bytes. When the value of the MC_Overlay_Size is less than 6, the overlay is invalid.

By setting data to these registers 341-347, the multicast address range X is defined as below formula.

$$MC\_base\_address \leq X < (MC\_Base\_Address + 2^{MC\_Index\_Position} * (MC\_Num\_Group+1))$$

The multicast register of this configuration are provided in each of the port 39-0~39-3 in the switch circuit 32.

For example, the packet analysis unit 34-2 determines whether or not the packet indicates the write of which the specified address X of the received packet (below described in FIG. 9) is within the particular address range defined by the above formula from the MC_Base_Address and the MC_Index_Position in the MC_Base_Address Register 343 when judging that the MC function is effect from the Multicast Control Register 341 of the multicast register 34-4.

And the packet analysis unit 34-2 determines the multicast when the received packet is the packet of write to the specified address range. The packet analysis unit 34-2 forwards the received packets to all other ports 39-1~39-3 when determining that the received packet indicates multicast.

Below, by referring to FIG. 6 and FIG. 7, the multicast function will be described in detail. FIG. 6 illustrates a diagram of the setting example of the multicast register in FIG. 5. FIG. 7 illustrates a diagram illustrating multicast operation in the setting example of the multicast register in FIG. 6.

In an example of FIG. 6, because the multicast function is effective, the setting values of the multicast function register (Multicast Capability Register) 342, the multicast reception register (MC_Receive Register) 344, the multicast block register (MC_Block_All Register) 345, and the Multicast block untranslated register (MC_Block_Untranslated Register) 346 within the multicast register illustrated in FIG. 5 are omitted.

Namely, in FIG. 6, the setting values of the MC_Enable and the MC_Num_Group in the Multicast Control Register 341, the, MC_Base_Address in the multicast base address register (MC_Base_Address Register) 343, and the MC_Overlay_Bar and the MC_Overlay_Size in the MC_Overlay_Bar 347 in the multicast registers are only illustrated.

When the values are set to the multicast register 34-4~37-4 in each of the ports 32 as illustrated in FIG. 6, the switch circuit 32 executes the multicast follow steps, as illustrated in FIG. 7.

(1) A send and receive buffer 34-0 in the port 39-0 receives the packet X of "address=0xA0000000" from the CPU 2.

(2) The packet analysis unit 34-2 in the port 39-0, determines that the multicast address range "0xA0000000≦X "0xA0001000" from the setting value (MC_Base_Address="0xA0000000", MC_Index_Position=12, MC_Num_Group=0) in the multicast register 34-4 of the port 39-0. The packet analysis unit 34-2 judges that the packet X is a multicast packet, because the address of the packet X is within the multicast address range.

(3) The packet analysis unit 34-2 forwards the received multicast packet X to each of the port 39-1~39-3 through the internal bus 38.

(4) In each of the ports 39-1~39-3, the packet analysis units 35-2~35-4 determine the same multicast address range by referring the multicast registers 35-4, 36-4 and 37-4, so the packet analysis units 35-2~35-4 in each of the ports 39-1~39-3 judge that the packet X received from the internal bus 38 is a multicast packet.

(5) The value "12" is set as the setting value of the overlay size MC_Overlay_Size in the multicast registers 35-4~37-4 in each of the ports 39-1~39-3. The packet analysis units 35-2~37-2 in each of the ports 39-1~39-3 determine that overlay settings are valid, because MC_Overlay_Size>6. Therefore, the packet analysis units 35-2~37-2 convert the address of the packet X to the address value which is set in the MC_Overlay_BAR of the own multicast registers 35-4~37-4, and transfer it to the input and output devices 5-0~5-2 via the PCIe bus 6-0~6-2.

Moreover, for example, to perform an unicast to the input and output device 5-0, the address of the packet is set to the value of "0x8001000". Because the packet address "0x8001000" is out of the multicast address range ("0xA0000000≦X<"0xA0001000"), it is determined as the unicast.

Similarly, when sending the multicast packets only to the input and output devices 5-0 and 5-2, a new Multicast Group for the multicast registers is defined, it is preferable to set a block of the Multicast Group in the multicast registers 34-4 and 36-4 (settings of the MC_Receive_Register 344 and the MC_Block_All Register 345).

(Input and Output Devices)

Figure 8:
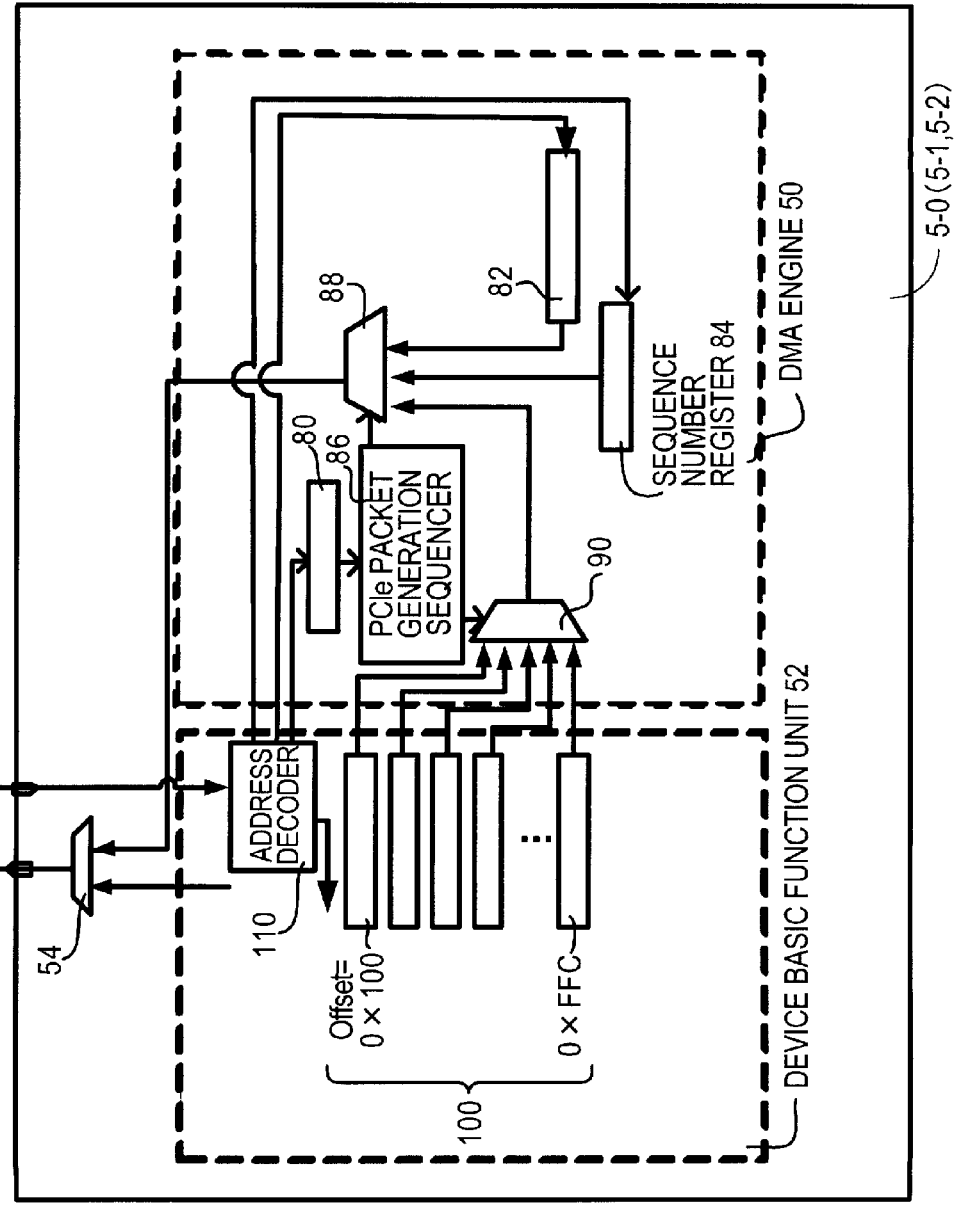
FIG. 8 is a diagram illustrating a construction of the input and output device in FIG. 3.
Figure 9:
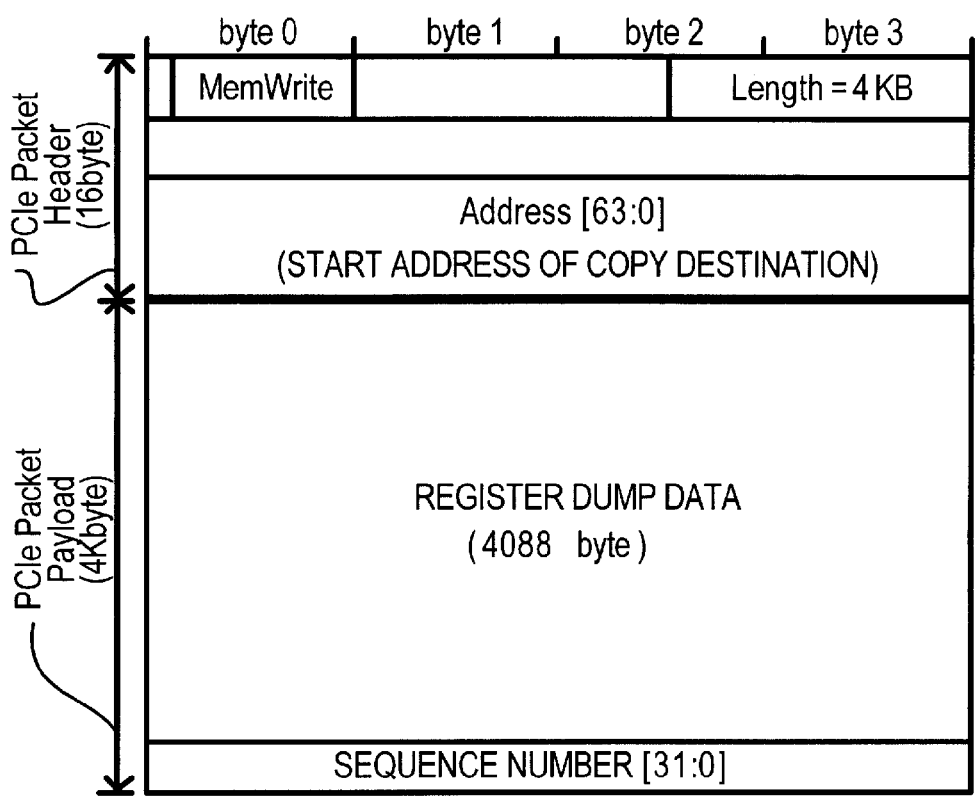
FIG. 9 is a diagram illustrating a PCI Express packet in FIG. 3 to FIG. 8.

FIG. 8 illustrates a block diagram of the input and output devices in the configuration illustrated by FIG. 3. FIG. 9 illustrates a diagram of the packet format in FIG. 8. As illustrated by FIG. 8, the input and output devices 5-0, 5-1 and 5-2 have a device basic function unit 52, the DMA circuit 50 and a first multiplexer 54. The device basic function unit 52 is an interface controller which controls an interface in the interface device or a network controller in a network device, for example.

The first multiplexer 54 selects either one of an output from the devices basic function unit 52 and an output of the DMA circuit 50, and outputs a select one to the PCIe bus 6-0~6-2. The device basic function unit 52 has a micro-controller (not illustrated in FIG. 8), register group 100 and an address decoder 110.

The register group 100 store data transfer status and control information, error information about the device and data transfer, performance information, such as device busy rate or throughput, and history information for sending and receiving data. The device driver 20 reads contents of the register group 100 via the PCIe bus 6-0~6-2.

The address decoder 110 decodes the address of the packet received form the PCIe bus 6-0~6-2, and transfers the received packet to the designated address.

In the embodiment, the input and output devices 5-0~5-2 a DMA circuit 50 for register copy (hereinafter referred to as a DMA engine) in addition to the device basic function unit 52. The DMA engine 50 has a copy start address registers 80, a copy destination address register 82, a sequence number registers 84, a selection circuit 90, a multiplexer 88 and a PCIe packet generation sequencer (circuit) 86.

The copy start address register 80 stores a copy start instructions set from the PCIe bus 6-0~6-2. The copy destination address register 82 stores address of the copy destination set from the PCIe bus 6-0~6-2. The sequence number register 84 stores a sequence number of the forward packet. The address decoder 110 stores setting values in the packet to the copy start address registers 80, the copy destination address register 82 and the sequence number registers 84 corresponding to the specified address.

The selection circuit 90 selects a specified register in the register group 100. And the second multiplexer 88 is inputted the address in the destination address register 82, register dump data from the selection circuit 90 and a sequence number of forwarding packet from the sequence number register 84 and outputs the packet to the multiplexer 54.

The PCIe packet generation sequencer 86 sequentially reads data of address Offset "0x0000" up to 0xFFFC in the register group 100 via the selection circuit 90 according a reception of the copy start instruction by 1 writing (as later described) to the copy start register 80. The PCIe packet generation sequencer 86 manipulates the second multiplexer 88, add the sequence number data of 4 byte in the sequence number register 84 to the last 4 byte of the read data, creates a PCIe payload (Payload) of 4 k byte, and adds the address of the copy destination address register 82 to the PCIe payload, to create the PCI express packet.

As illustrated in FIG. 9, format of the PCI express packet format has a PCIe packet header (Packet Header) of 16 byte and a PCIe packet payload of 16 k byte. In the embodiment, a packet type of "Mem Write", a payload length=4 KB, and a copy destination address (a copy start copy) are set in the PCIe packet header. And the register data (described as register dump data) and the sequence number read from the register group 100 are set to the PCIe packet payload.

The PCIe packet outputted from the second multiplexer 88 is outputted to the PCIe 6-0~6-2 via the first multiplexer 54.

(Device Information Collection Process)

Figure 10:
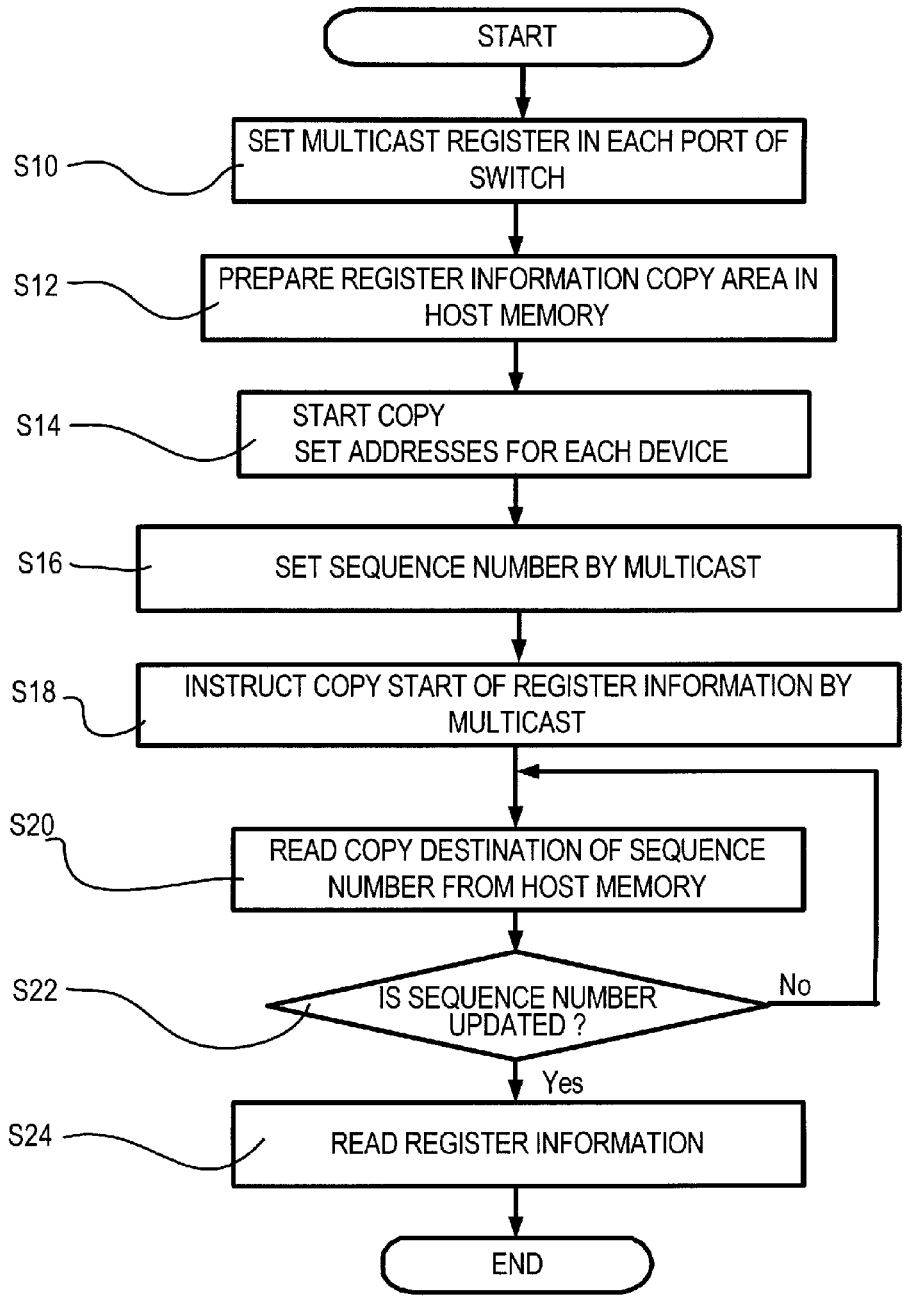
FIG. 10 is a diagram illustrating a flow chart of the collection process of device information in the device driver according to the embodiment.
Figures 11, 12:
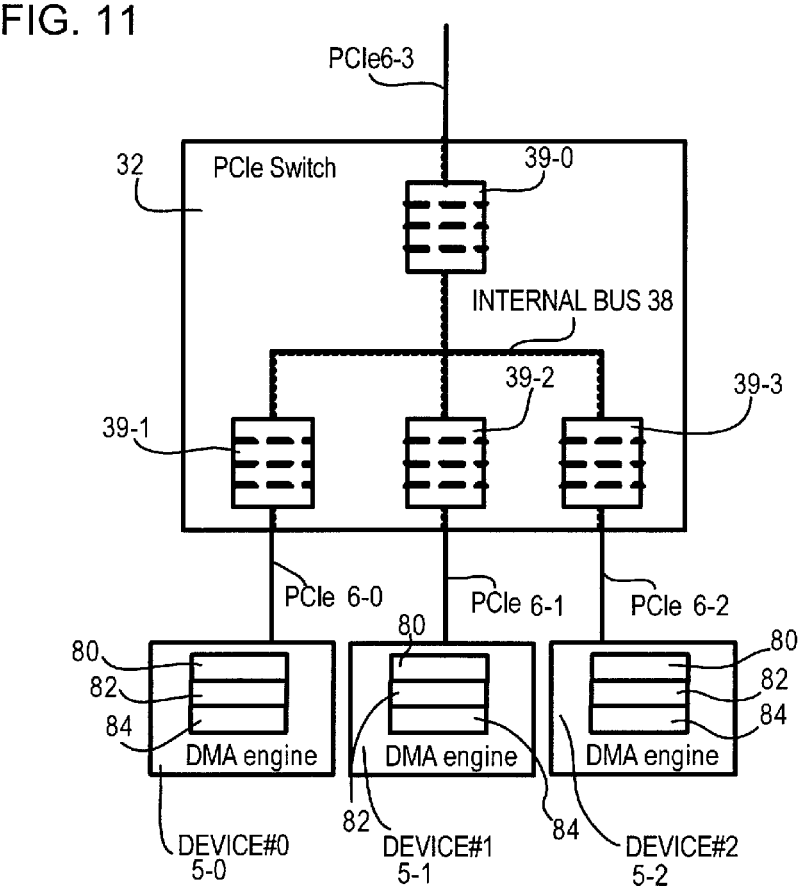
FIG. 11 is a diagram illustrating a address setting process of the multicast register in FIG. 10.
FIG. 12 is a diagram illustrating a relationship between the setting address of the multicast register and register address of each input and output device in FIG. 10 and FIG. 11.
Figure 13:
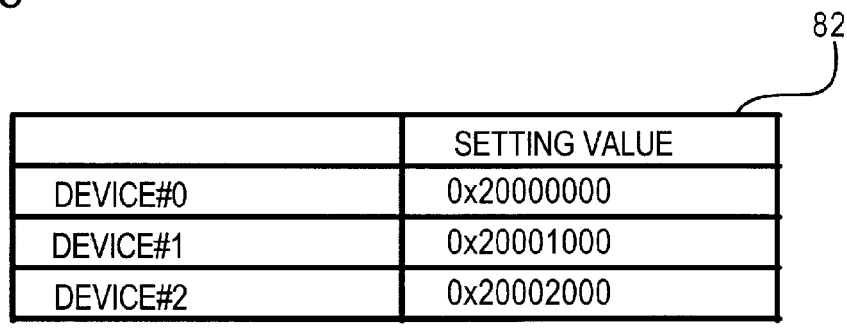
FIG. 13 is a diagram illustrating setting value of copy-destination address register in FIG. 10.
Figure 14:
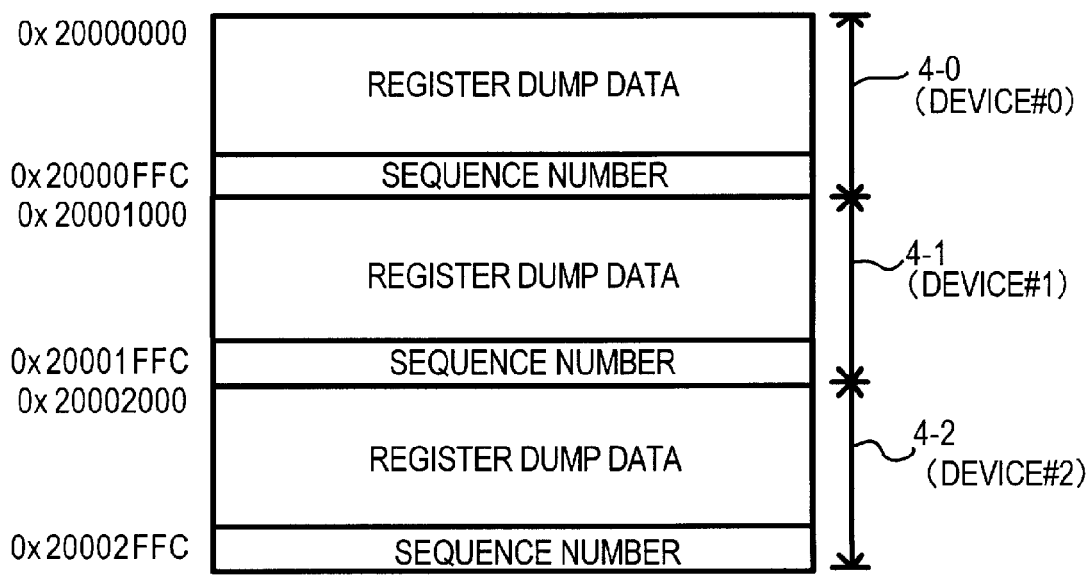
FIG. 14 is a diagram illustrating storage status of register data collected in a host memory in FIG. 10.

Next, the device information collection process by the device driver will be explained. FIG. 10 illustrates a flow diagram of the device information collection process by the device drive according to the embodiment. FIG. 11 illustrates an explanation diagram of multicast register address setting process in FIG. 10. FIG. 12 illustrates a relationship diagram for setting address of the multicast register with register address of each of the input and output devices. FIG. 13 illustrates an explanation diagram of the setting value in the copy destination address register in FIG. 10. FIG. 14 illustrates a diagram of explanation of storing status of the register data which were collected in the host memory in FIG. 10.

By referring to FIG. 11-FIG. 14, the device information collection process by the device driver according to FIG. 10.

(S10) The device driver 20 sets the setting values described in FIG. 6 to the multicast registers 34-4, 35-4, 36-4 and 37-4 in each of the ports 39-0~39-3 in the switch circuit 32, as a preparation of multicast. That is, the device driver sets configuration write (Configuration Write) to the packet type and each of multicast register address to the address and the setting values to the payload in the PCIe packet format described in FIG. 9 and sends the packet to the switch circuit 32 via the IO hub 30 and the PCIe bus 6-3.

The port 39-0 in the switch circuit 32 receives each packet which is set the setting value of the multicast register for each port. The packet analysis unit 34-2 in the port 39-0 judges the unicast from the packet type. And packet analysis unit 34-2 writes the setting value in the received packet to the multicast register 34-4 when the address in the received packet designates the address of own multicast register 34-4.

Moreover, the packet analysis unit 34-2 forwards the received packet to specified ports 39-1~39-3 through the internal bus 38, when the address in the received packet designates the address of the multicast registers 35-4~37-4 in other ports 39-1~39-3. In the ports 35-4~37-4 which received the packet, the packet analysis units 35-2~37-2 writes the setting value in the received packet to the multicast registers 35-4~37-4.

As illustrated by FIG. 11, when setting the setting values depicted by FIG. 6 to each of the multicast registers 35-4~37-4, it is possible to set different address to the address in the copy start register 80, in the copy destination address register 82 and in the sequence number registers 84 of the DMA engine 50 in each of the input and output devices 5-0~5-2 in multicast.

In the embodiment, as illustrated by FIG. 12, in the case of the register address (0xA0001000) in the packets in FIG. 7, the register addresses in the copy start register 80 of the DMA engine 50 in each of the input and output devices 5-0~5-2 are set to the setting value of MC_OVerlay_Bar, that is, "0x80001000", "0x80002000", "0x80003000" (hexadecimal notation), in the setting values illustrated in FIG. 6.

When bit width of each registers 80, 82, 84 is 16 bits, the register addresses in the copy destination address register 82 of the DMA engine 50 in each of the input and output devices 5-0~5-2 are set to values of "0x80001004", "0x80002004" and "0x80003004" (hexadecimal notation) which are (MC_Overlay_Bar in the setting values illustrated in FIG. 6, that is, "0x80001000", "0x80002000" and "0x80003000"+ "0x00000004").

Similarly, the register address in the sequence number registers 84 of the DMA engine 50 in each of the input and output device 5-0~5-2 are set to values of "0x80001008", "0x80002008" and "0x80003008" (hexadecimal notation) which are (the setting value of MC_Overlay_Bar "0x80001000", "0x80002000" and "0x80003000" in the setting values illustrated in FIG. 6+"0x00000008").

In this way, the device driver 20 sets the setting values described in FIG. 5 and FIG. 6 to the multicast register 34-4, 35-4, 36-4 and 37-4 in each ports 39-0~39-3 in the switch circuit 32. By this manner, it is possible to write data to each of the registers 80, 82 and 84 in the DMA circuit 50 by using the multicast function.

(S12) The device driver 20 secures area 4-0~4-2 which store the register information copied from the input and output devices 5-0~5-2 in a specified location in the host memory 4. In the embodiment, because single input and output device has 4 Kbytes register information, the areas require 3*4 Kbytes. Accordingly, the device driver 20 secures the area from "the address "0x20000000" to the address "0x20002FFF" in the host memory 4.

(S14) The device driver 20 sets the start address secured in the host memory to the copy destination address register 82 in each of the input and output device 5-0~5-2. In this case, because the copy destination address values are different in each of the input and output devices 5-0~5-2, the device driver 20 sets memory write (Write MEM) to the packet type, address of the copy destination address register 82 of each of the input and output device 5-0~5-2 to the address and each start address to the payload in the PCIe packet format, as explained in the step S10, and sends the packet to the switch circuit 32 via the hub 30 and the PCIe bus 6-3.

The port 39-0 in the switch circuit 32 receives each packets which are set the setting values of the copy destination start address for each of input and output devices 5-0~5-2. The packet analysis unit 34-2 of the port 39-0 transfers the received packet to the port 39-1-39-3 which is specified through the internal bus 38.

In the ports 39-1~39-3 which received the packet, the packet analysis unit 35-2-37-2 transfers the received packet to the input and output devices 5-0-5-2 through the PCIe bus 6-0~6-2. In the input and output device 5-0-5-2, the address decoder 110 decodes the packet address and writes the setting value (copy destination start address) of the received packet to the copy destination address register 82.

FIG. 13 illustrates a diagram of an example of the copy destination address in the copy destination address register 82 in each of the input and output devices 5-0-5-2. As described in the step S12, because the device driver 20 secures the area from address "0x20000000" to address "0x20002FFF" in the host memory 4, in the copy destination address register 82 in each of the input and output device 5-0-5-2, the copy destination address are "0x20000000", "0x20001000", "0x20002000".

(S16) Next, the device driver 20 sets the sequence number by the multicast. The device driver 20 uses the sequence number to verify that the data on the host memory 4 corresponds to the copy instructions when the device information was copied. That is, the device driver 20 sends PCIe packet, which is set the packet type "Write MEM", address="0xA0000008", data (payload) "0x01234567", to the switch circuit 32 via the IO hub 30 and the PCIe bus 6-3. This data "0x01234567" is a value which is added (incremented) by "1" each time of execution of a copy of the register information and is set the value which is different from at least last copy of the register information.

In the switch circuit 32, the packet analysis unit 34-4 in the port 39-0 determines the received packet as the multicast packet from the address of the packet "0xA0000008" and forwards the received packet to each of the ports 39-1-39-3 via the internal bus 38. The packet analysis units 35-2~37-2 also determine the received packet as the multicast packet from the address of the packet "0xA0000008".

And the packet analysis unit 35-2-37-2 converts the address of the received packet to the register address value in the sequence number registers 84 of the DMA engine 50, that is, address value "0x80001008", "0x80002008" and "0x80003008" (hexadecimal notation) using the setting value of MC_Overlay_Bar "0x80001000", "0x80002000" and "0x80003000". The packet analysis units 35-2-37-2 transfers packets with converted address to the input and output devices 5-0-5-2 through the PCIe bus 6-0-6-2. In the input and output devices 5-0-5-2, the address decoder decodes the packet address, and writes the setting value (sequence number) in the received packet to the sequence number registers 84.

(S18) The device driver 20 instructs a copy start of the register information by the multicast. That is, the device driver 20 sets the address=0xA0000000" and the data="0x00000001" (bit0 to the copy start instruction bit in the embodiment). In detail, the device driver 20 sends the PCIe packet, which was set the packet type "Write MEM", the address="0xA0000000", and the data (payload)= "0x00000001", to the switch circuit 32 through the IO hub 30 and the PCIe bus 6-3.

In the switch circuit 32, the packet analysis unit 34-3 in the port 39-0 determines the received packet as the multicast packet from the address of the packet "0xA0000000", and forwards the packet to the each port 39-1-39-3 through the internal bus 38. The packet analysis units 35-2-37-2 in each ports 39-1-39-3 determine the received packet as the multicast packet from the address of the packet "0xA0000000".

And the packet analysis units 35-2-37-2 convert the address ("0xA0001000" in FIG. 7) of the received packet to the register address value "0x80001000", "0x80002000" and "0x80003000" (hexadecimal notation) of the copy start address register 80 in the DMA engine 50 using the setting value "0x80001000", "0x80002000", "0x80003000" in MC_Overlay_Bar. The packet analysis units 35-2-37-2 forwards the packet with converted address to the input and output devices 5-0-5-2 through the PCIe bus 6-0-6-2. In the input and output devices 5-0-5-2, the address decoder 110 decodes the packet address, and writes the setting value (copy start instruction) of the received packet to the copy start register 80.

The PCIe packet generation sequencer 86 monitors the copy start register 80 and judges whether the copy start instruction have been written to the copy start register 80. The PCIe packet generation sequencer 86 starts the copy of register information to the host memory specified when determining that the copy start instructions have been written to the copy start register 80.

Namely, the PCIe packet generation sequencer 86 sequentially selects the selection circuit 90, and reads data of the register group 100 in address Offset "0x0000" up to "0xFFFC". The PCIe packet generation sequencer 86 manipulates the second multiplexer 88, adds a 4 byte sequence number in the sequence number register 84 to final 4 byte in the read data to create a 4 k-byte payload of PCIe (the Payload), adds the address in the copy destination address register 82 to the PCIe payload to create a PCI express packet.

The PCIe packet (referring to FIG. 9) from the second multiplexer 88 is sent to the PCIe bus 6-0, 6-1, 6-2 via the first multiplexer 54. The switch circuit 32 transfers the PCIe packets received from each of the input and output devices 5-0-5-2 to the CPU 2 through the IO hub 30 and the PCIe bus 6-3. The CPU 2 stores the transferred packets to area 4-0-4-2 in the host memory 4 specified by the address. As illustrated by FIG. 14, the register dump data (payload) from each of the input and output devices 5-0-5-2 are stored in the area 4-0-4-2, of which the start is specified by copy start address, in the host memory 4.

(S20) The device driver 20 reads the sequence number in the host memory 4. That is, the device driver 20 reads contents the area (in FIG. 14, the memory address "0x20000FFC", "0x20001FFC" and "0x20002FFC" (hexadecimal notation)) that the sequence number of each devices are copied in the host memory 4. In the example of FIG. 14, the sequence number exist in the position of the copy start address+0xFFC.

(S22) The device driver compares the read data with the value ("0x01234567" in the embodiment) set by step S16 values. The device driver 20 advance step S24 when determining that the read value is same as the set value by step S16, because copies of the register information in the host memory 4 completed.

Conversely, when the device driver 20 judged that the read value is different from the value set in the step S16, the device driver 20 again executes the process in the step S20 after a certain time.

(S24) When the device driver 20 determines that the read value is same as the value set by the step S16, the device driver 20 reads copy of register information from the host memory 4.

In this way, the processing in the step S10-S24 are required when the initial register information collection, but the processing in the step S10-S14 are not required in a second and later register information collection. Therefore, it is possible to shorten time to read-out (Read) registers of each of the input and output devices because instructing a start of the DMA transfer by using the multicast function. Also, because instructing the DMA transfer at almost same time, it is possible to copy status of the input and output devices in a same time. In particular, it is effective when the number of the input and output devices to conduct the register read (Read) is large or the data collection perform in many times.

(Processing of Lump Download)

Figure 15:
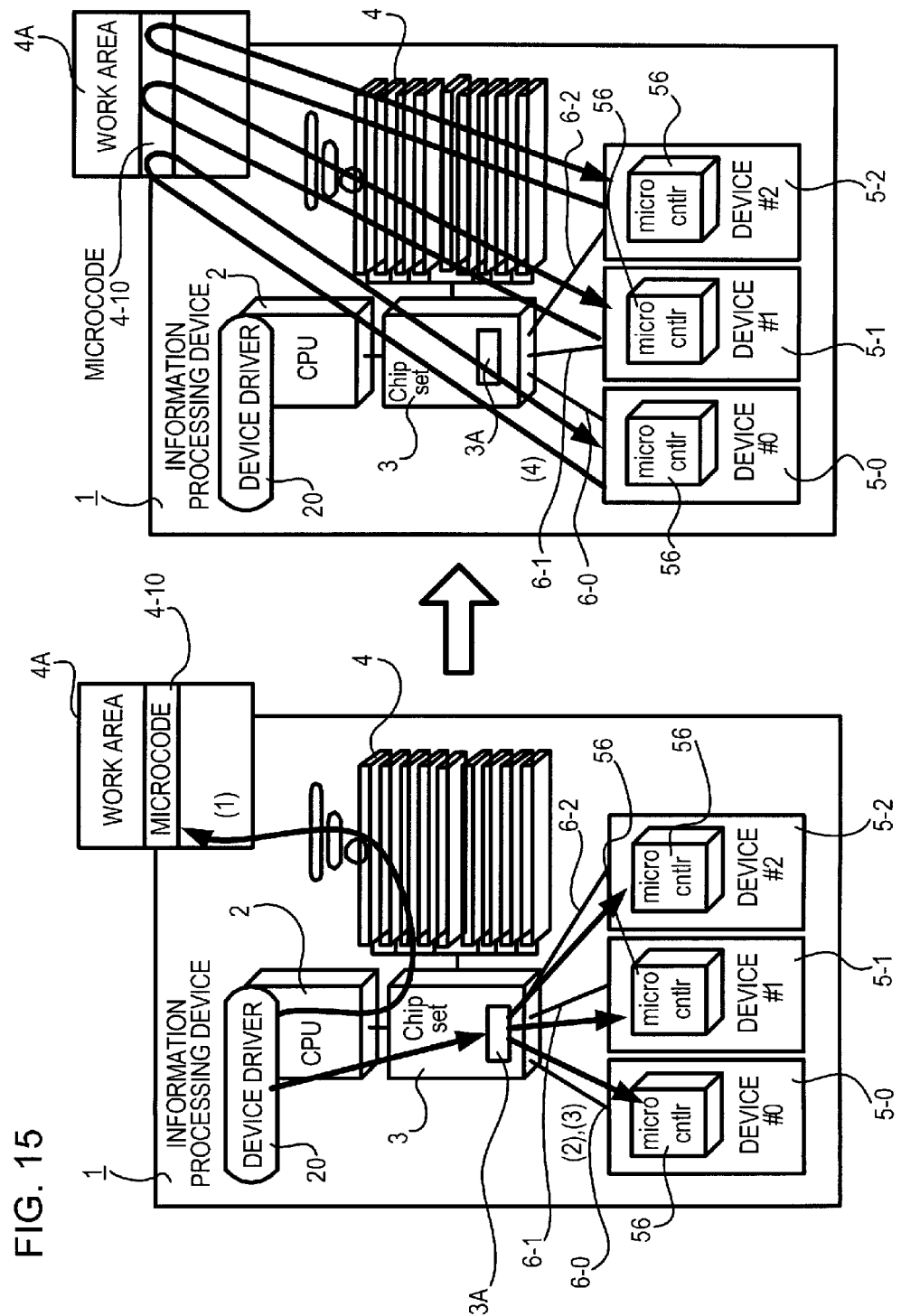
FIG. 15 is a diagram illustrating load process of micro code according to another embodiment.

Next, a lump download process which is applied the multicast function as described above will be explained. FIG. 15 illustrates a diagram of the lump download process in the embodiment. In FIG. 15, same elements depicted by FIG. 1~FIG. 4 are depicted by same signs.

As illustrated by FIG. 15, the information processing device 1 includes an arithmetic processing unit (CPU: Central Processing Unit) 2, a host memory 4 which is used by the host (CPU), a bridge circuit (described as a Chipset) 3 having a multicast function and a plurality of input and output devices 5-0, 5-1 and 5-3 connected to the bridge circuit with 4.

The information processing device 1 is installed the device drivers 20 which drives each of the input and output devices 5-0-5-2. The CPU 2 runs the device driver 20 to drive each of the input and output devices 5-0-5-2. The bridge circuit 3 connects each of the input and output devices 5-0-5-2 in a point-to-point by signal lines 6-0-6-2.

For example, the signal lines 6-0-6-2 are constructed by serial signal lines of PCI (Peripheral Component Interface) express standard. The bridge circuits 3 has a multicast function (Multicast) 3A. As the multicast function, it is preferable to apply the multicast function which is defined by the PCI express specification rev (revised) 2.0, 2.1. for example.

The input and output devices 5-0-5-2 are constructed by the interface device or the network device and has a micro-controller (Micro Controller) 56. For example, the interface device is constructed by a SCSI (Small Computer System Interface) card device, a SAS (Serial Attached SCSI) card device, and a FC (Fibre Channel) device, etc. This interface device are connected to an external storage device, etc. which is provided out of the information processing device 1.

The micro controller 56 performs the microcode (firmware program) and executes an interface function with a desired protocol. When starting the information processing device 1 or updating the microcode, the device driver 20 in the information processing device 1 loads the microcode to the micro controller 56 in the input and output devices 5-0-5-2.

The input and output devices 5-0-5-2 has a load starting address register and a load start register as described later. The loading of the microcode uses the multicast function using these registers.

(1) The device driver 20 allocates (writes) the microcode in a specific area 4-10 in the host memory 4.

(2) The device driver 20 writes load start address to the load start address register in each of the input and output devices 5-0-5-2 by the multicast.

(3) The device driver 20 instructs a start of loading the microcode to the input and output devices. That is, the device driver 20 writes a load start to the load start register in each of input and output devices 5-0-5-2 by the multicast.

(4) The input and output devices 5-0-5-2, which are received the starting instructions, load the micro code from the starting address of the host memory 4.

When a connection system is different from the connection system in the embodiment of which a large number of the input and output devices are connected by a common bus, the input and output devices can quickly load the microcode in the memory. However, when the input and output devices are connected to the switch circuit by a point to point such as PCIe, such as the embodiment, the device driver 20 is required to instruct the start address notifications and load instructions to each of the input and output devices which are connected. Therefore, the loading time of the microcode increases.

By instructing the start address and the load instructions by the multicast function such as the embodiment, even though the number of input and output devices increase, it is possible to shorten the time required for loading microcode.

Figure 16:
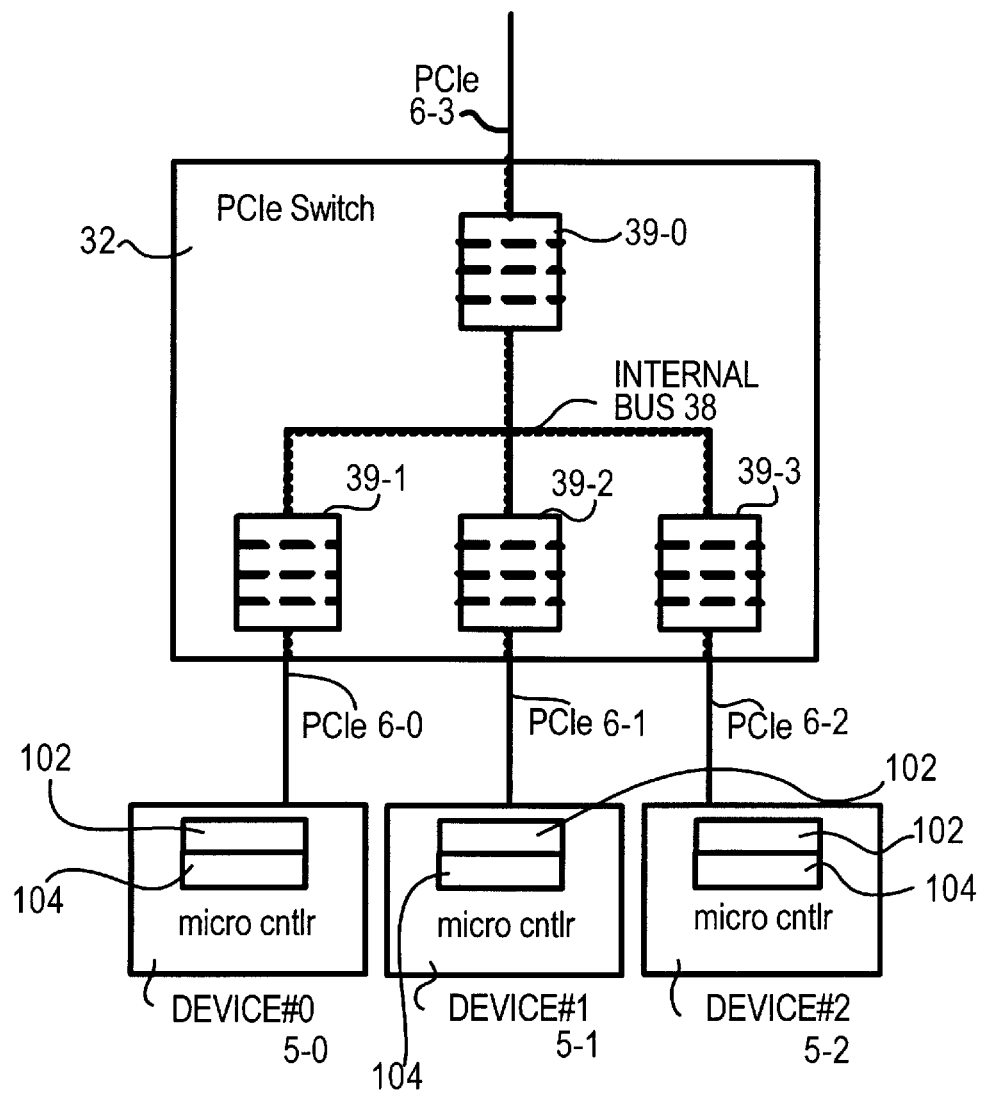
FIG. 16 is a block diagram illustrating a switch and a input and output device in FIG. 15.

Below, the embodiment will be described in detail. FIG. 16 illustrates a diagram of a configuration of the switch circuit and each of the input and output devices as depicted in FIG. 15 and FIG. 3. In FIG. 16, same elements as described in FIG. 3, FIG. 4 and FIG. 7 are depicted by same signs, because, in FIG. 16, the construction of the switch circuit 32 is same as the construction in FIG. 3, FIG. 4 and FIG. 7. Further, the description of multicast function is omitted because the multicast function in FIG. 16 is same as one described in FIG. 4 to FIG. 7.

In FIG. 16, the switch circuit 32 a first port which connects to the PCIe bus 6-3, second, third and fourth ports 39-1-39-3 which each connects PCIe buses 6-0-6-2, and an internal bus 38 which connects to each ports 39-0-39-3.

As illustrated in FIG. 4, each port 39-0-39-3 has a packet send and receive buffers 34-0, 35-0, 36-0, 37-0, and a packet analysis unit 34-2, 35-2, 36-2, 37-2 each having a multicast register 34-4, 35-4, 36-4, 37-4. And the multicast function of the packet analysis unit is the same one described in FIG. 4 to FIG. 7.

Each of the input and output devices 5-0-5-2 has a load start address register 102 and a load start register 104 for loading the microcode.

Figures 17, 18:
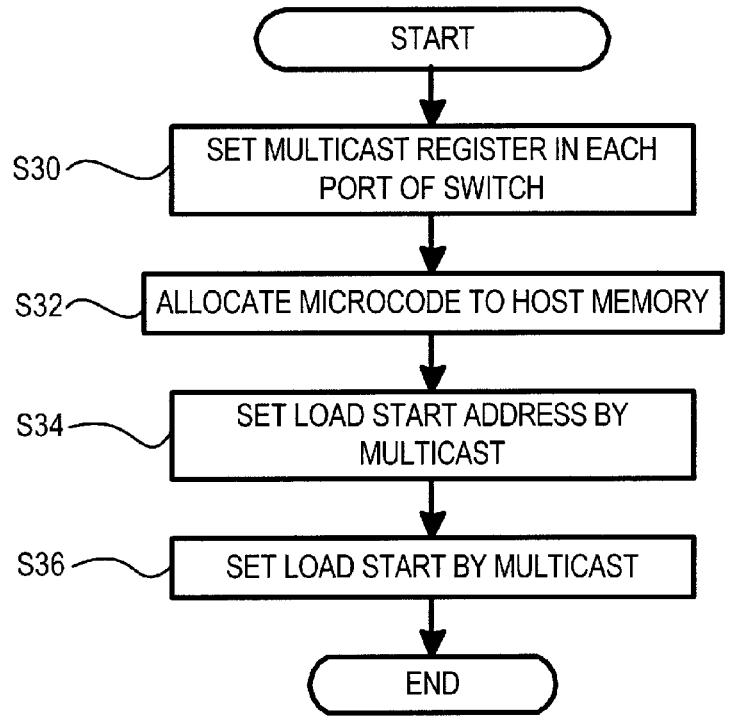
FIG. 17 is a diagram illustrating a flow chart of the load process of micro code in FIG. 15.
FIG. 18 is a diagram illustrating a setting example of the address value in the input and output device in FIG. 17.

FIG. 17 illustrates a flow diagram of microcode load process according to the embodiment. FIG. 18 illustrates a diagram of an address in the registers according to processing illustrated in FIG. 17. FIG. 19 illustrates a diagram of an example of setting values in the multicast registers 34-4-37-4 of each port.

(S30) The device driver 20 sets the setting values as described in FIG. 19 to the multicast registers 34-4, 35-4, 36-4, 37-4 in each ports 39-0-39-3 of the switch circuit 32 for a preparation of the multicast. That is, the device driver 20 sets "Configuration Write" to the packet type, addresses for each multicast registers to the address, and the setting values to the payload in the PCIe packet format described in FIG. 9 and send the packet to the switch circuit 32 via IO hub 30.

The port 39-0 in the switch circuit 32 receives each packet which is set setting values for the multicast registers of each port. The packet analysis unit 34-2 in the port 39-0 determines unicast packet from the packet type. And the packet analysis unit 34-2 writes the setting values in the received packet to the multicast register 34-4 when the address of the received packet designates an address of own multicast register 34-4.

Moreover, the packet analysis unit 34-2 forwards the setting values in the received packets to specified ports 39-1-39-3 through the internal bus 38 when the address of the received packet designates address of the multicast registers 35-4-37-4 in other ports 39-1-39-3. In the port 39-1-39-3 which received the packet, the packet analysis unit 35-2-37-2 writes the setting values in the received packet to the multicast register 35-4-37-4.

In FIG. 19, as same as the case in FIG. 6, because the multicast is valid, the setting values in the multicast function registers (Multicast Capability Register) 342, the multicast receive registers (MC_Receive Register) 344, the multicast block registers (MC_Block_All Register) 345 and the multicast block untranslated registers (MC_Block_Untranslated Register) 346 within the multicast registers in FIG. 5 are omitted.

That is, within the multicast registers, the setting values of the MC_Enable and the MC_Num_Group in the multicast control register 341, of the MC_Base_Address and the MC_Index_Position in the multicast base address register (MC_Base_Address Register) 343 and of the MC_Overlay_Bar and the MC_Overlay_Size in the multicast overlay register (MC_Overlay_Bar) 347 are only represented in FIG. 19.

When setting the setting values represented by FIG. 19 to each of the multicast registers 35-4-37-4, different addresses can be set to the register address of the load start address register 102 and the loading start register 104 in each of the input and output devices 5-0-5-2 by the multicast.

As illustrated by FIG. 18, in the embodiment, the register addresses of the load start address register 102 in each of the input and output devices 5-0-5-2 are set in the values "0x80001010", "0x80002010", "0x80003010" (hexadecimal notation) which are added (overlay) a load packet address (0xA0000010) to the set values of MC_Overlay_Bar "0x80001000", "0x80002000", "0x80003000" (hexadecimal notation) within the setting values in FIG. 19.

And when bit width of each registers 102 and 104 is 16 bits, the register addresses of the load start register 104 in each of the input and output devices 5-0-5-2 are set in the values of "0x80001014", "0x80002014", "0x80003014" (hexadecimal notation) which are (the value "0x00000014"+the setting values "0x80001000", "0x80002000", "0x80003000" (hexadecimal notation) of the MC_Overlay_Bar within the setting values in FIG. 19.

In this way, the device driver 20 sets the setting values described in FIG. 5 and FIG. 19 to the multicast registers 34-4, 35-4, 36-4 and 37-4 in each ports 39-0-39-3 of the switch circuit 32. By these setting, it is possible to write data to each registers 102 and 104 by using multicast function.

(S32) The device driver 20 allocates the microcode to the host memory 4. As described by FIG. 15, the device driver 20 allocates the microcode which will be loaded in the input and output devices to specified area 4-10 (address="0x20000000" in the embodiment) of the host memory 4.

(S34) The device driver 20 sets the microcode store starting address of the host memory 4 to the load start address register 102 in each of the input and output devices 5-0-5-2. That is, the device driver 20 sends the PCIe packet which is set the packet type "Write MEM", the address="0xA0000010", the data (payload)="0x20000000" (start address) to the switch circuit 32 through the IO hub 30.

In the switch circuit 32, the packet analysis unit 34-2 in the port 39-0 determines that the received packet is multicast packet from the address of the packet "0xA0000010" and forwards the packet to each port 39-1-39-3 via the internal bus 38. The packet analysis units 35-2-37-2 in each port 39-1-39-3 determine that the received packet is multicast packet from the address of the packet "0xA0000010".

And the packet analysis units 35-2-37-2 converts the address of the received packet to the register address values "0x80001010", "0x80002010", "0x80003010" (hexadecimal notation) of the load start address register 102 by using the setting values of the MC_Overlay_Bar "0x80001000", "0x80002000", "0x80003000". The packet analysis units 35-2-37-2 forwards the packet with the translated addresses to the input and output devices 5-0-5-2 through the PCIe bus 6-0-6-2. In the input and output devices 5-0-5-2, the address decoder 110 (referring to FIG. 8 and not depicted in FIG. 15) decodes the packet address and writes the setting value (start address) in the received packet to the load start address register 102.

(S36) The device driver 20 instructs a start of load by multicast. The device driver 20 sets data="0x00000001" (the bit0 being a load start instruction bit in the embodiment) to the address="0xA0000014". That is, the device driver 20 sends the PCIe packet, which is set in the packet type "Write MEM", the address="0xA0000014", the data (payload)="0x00000001", to the switch circuit 32 through the IO hub 30.

In the switch circuit 32, the packet analysis unit 34-2 of the port 39-0 determines that the received packet is multicast packet from the address of the packet "0xA0000014" and forwards the packet to each port 39-1-39-3 via the internal bus 38. The packet analysis units 35-2-37-2 in each port 39-1-39-3 determine that the received packet is multicast packet from the address of the packet "0xA0000014".

And the packet analysis units 35-2-37-2 converts the address of the received packet to the register address values "0x80001014", "0x80002014", "0x80003014" (hexadecimal notation) of the load start register 104 by using the setting values of the MC_Overlay_Bar "0x80001000", "0x80002000" and "0x80003000". The packet analysis unit 35-2-37-2 sends the packet with converted addresses to the input and output devices 5-0-5-2 via the PCIe bus 6-0-6-2. In the input and output devices 5-0-5-2, the address decoder 110 decodes the packet address i and writes the setting values (load start instruction) in the received packet to the load start register 104.

The micro controller 56 in each of the input and output devices 5-0-5-2 monitor the road start register 104 and judges whether the load start instruction writes to the load start register 104. When the micro controller 50 determines that the load start instruction has been written to the load start register 104, the micro controller 50 accesses the host memory 4 by the start address of the microcode written in the load start address register 102, reads the micro-code 4-10 in the host memory 4, and writes to a memory in the micro controller 56.

That is, the micro controller 56 creates the PCI express packet which is set the packet type "Read MEM" and the start address of the load start address register 102 to the PCI header, and sends the packet to the PCIe bus 6-0, 6-1, 6-2. The switch circuit 32 transfers the received PCIe packets from each of the input and output devices 5-0-5-2 to the CPU 2 through the IO hub 30. The CPU 2 analyzes the PCIe packets and transfers the microcode in the area 4-10 which is specified by the address of the host memory 4 to each input and output device 5-0-5-2 through the IO hub 30 and the switch circuit 32.

When executing a subsequent microcode loading at a second and later time, processing in the steps S30 and S32 are unnecessary. In this way, by instructing the start address and the start of load, even though the number of input/output devices that require load of the micro code increase, it is possible to shorten the time required for loading microcode.

The Other Embodiments

In the aforementioned example, a multicast function of the PCI Express standard was explained as an example, the other multicast function in the other standard, which judges whether the received packet is a multicast or unicast packet by setting of the multicast function to the switch circuit, may be applied. Also a connection standard of the input and output devices is not limited to the PCI Express standard and other connection standards may be applied.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. An information processing device comprising:
an arithmetic processing unit;
a memory device that is used by the arithmetic processing unit;
a plurality of input and output devices, that each has a DMA circuit and a memory unit that stores state information; and
a bridge circuit that connects the arithmetic processing unit with the plurality of input and output devices, and multicasts a packet from the arithmetic processing unit to the plurality of input and output devices according to a multicast setting from the arithmetic processing unit,
wherein the arithmetic processing unit instructs a packet that instructs a copy start to the bridge circuit, the bridge circuit multicasts the packet to the plurality of input and output devices, and the DMA circuits in the plurality of input and output devices DMA transfer the state information in the memory unit to the memory device through the bridge circuit in response to the packet.

2. The information processing device according to claim 1, wherein the DMA circuit includes a copy start register that stores an instruction of the copy start in the packet,
and wherein the bridge circuit converts an address of the packet to addresses of the copy start register in each of the plurality of input and output devices depending on the multicast setting and multicasts the packet to the plurality of input and output devices.

3. The information processing device according to claim 1, wherein the arithmetic processing unit sends a second packet that indicates a sequence number of the transfer to the bridge circuit,
and wherein the bridge circuit multicasts the second packet to the plurality of input and output devices, and each the DMA circuit in the plurality of input and output devices DMA transfer the state information added the sequence number to the memory device through the bridge circuit.

4. The information processing device according to claim 3, wherein the DMA circuit includes a sequence number register that stores the sequence number that is multicast,
and wherein the bridge circuit converts an address of the second packet to addresses of the sequence number registers in the plurality of input and output devices depending on the multicast setting and multicasts the second packet to the plurality of input and output devices.

5. The information processing device according to claim 3, wherein the arithmetic processing unit compares the sequence number of the second packet with a sequence number stored in the said memory device and detects a completion of the transfer.

6. The information processing device according to claim 1, wherein the bridge circuit judges whether the packet that is received from the arithmetic processing unit is a multicast or a unicast depending on the multicast setting.

7. The information processing device according to claim 6, wherein the DMA circuit includes a copy destination address register that stores a destination address of the memory device,
and wherein the arithmetic processing unit sends third packets of each of the plurality input and output devices to the bridge circuit, said third packets specifying the destination address for each of the plurality of input and output devices secured in the memory device,
and the bridge circuit performs unicast of the third packets to each of the plurality of input and output devices, and each of the plurality of input and output devices store each copy destination address to the copy destination address register, and the DMA circuit DMA transfers the state information added the copy destination address to the memory device via the bridge circuit.

8. The information processing device according to claim 6, wherein the bridge circuit comprises:
a multicast register that stores setting information of the multicast from the arithmetic processing unit; and
a packet analysis unit that determines whether unicasts or multicasts the packet that is received by referring the setting information in the multicast register.

9. The information processing device according to claim 8, wherein the packet analysis unit determines whether unicasts or multicasts from an address of the packet that is received by referring the setting information in the multicast register.

10. The information processing device according to claim 1, wherein the arithmetic processing unit sends a fourth packet that instructs a load start address of load information in the memory device and a fifth packet that instructs a load start to the bridge circuit, the bridge circuit multicasts the fourth and fifth packets to the plurality of input and output devices, and the plurality of input and output devices reads information of the load start address in the memory device through the bridge circuit in response to the fifth packet.

11. A method of collection process of device information in an information processing device, the information processing comprising an arithmetic processing unit, a memory device that is used by the arithmetic processing unit, a plurality of input and output devices having a memory unit that stores state information and a DMA circuit and a bridge circuit that connects the arithmetic processing unit with the plurality of input and output devices and multicasts a packet from the arithmetic processing unit to the plurality of input and output devices according to a multicast setting from the arithmetic processing unit, the method comprising:
setting the multicast to the bridge circuit by the arithmetic processing unit;
sending a packet that instructs a copy start to the bridge circuit by the arithmetic processing unit;
multicasting the packet to the plurality of input and output devices by the bridge circuit; and
DMA transferring the state information in the memory unit to the memory device through the bridge circuit by the DMA circuit in the plurality of input and output devices.

12. The method according to claim 11, wherein the multicasting comprising:
converting address of the packet to addresses of a copy starting register in each of the plurality of input and output devices by the bridge circuit depending on the multicast setting; and
multicasting the packet to the plurality of input and output devices.

13. The method according to claim 11, the method further comprising:
sending a second packet that instructs a sequence number of the transfer to the bridge circuit by the arithmetic processing unit; and
multicasting the second packet to the plurality of input and output devices by the bridge circuit, and
wherein the DMA transferring comprises DMA transferring the state information added the sequence number to the memory device through the bridge circuit.

14. The method according to claim 13, wherein the multicasting of the second packet comprising:
converting an address of the second packet to addresses of sequence number registers in the plurality of input and output devices depending on the multicast setting; and
multicasting the second packet to the plurality of input and output devices.

15. The method according to claim 13, wherein the method further comprising:
comparing the sequence number of the second packet with a sequence number stored in the said memory device; and
detecting a completion of the transfer according result of the comparing.

16. The method according to claim 11, the multicasting comprises judging whether the packet that is received from the arithmetic processing unit is a multicast or a unicast depending on the multicast setting.

17. The method according to claim 16, wherein the method further comprising:
sending third packets of each of the plurality input and output devices to the bridge circuit, said third packets specifying the destination address for each of the plurality of input and output devices secured in the memory device;
performing unicast of the third packets to each of the plurality of input and output devices; and
storing each copy destination address to a copy destination address register in each of input and output devices,
and wherein the DMA transferring comprises DMA transferring the state information added the copy destination address to the memory device via the bridge circuit.

18. The method according to claim 16, wherein the multicasting comprises determining whether unicasts or multicasts the packet that is received by referring setting information in the multicast register that stores the multicast setting from the arithmetic processing unit.

19. The method according to claim 18, the multicasting comprises determining whether unicasts or multicasts from an address of the packet that is received by referring setting information in the multicast register that stores the multicast setting from the arithmetic processing unit.

20. The method according to claim 11, the method further comprising:
sending a fourth packet that instructs a load start address of load information in the memory device and a fifth packet that instructs a load start to the bridge circuit;
multicasting the fourth and fifth packets to the plurality of input and output devices; and reading information of the load start address in the memory device through the bridge circuit in response to the fifth packet.

\* \* \* \* \*